United States Patent [19]

Eichhorn et al.

[11] 4,230,643

[45] Oct. 28, 1980

[54] PROCESS FOR THE MANUFACTURE OF A VINYL ESTER COPOLYMER

[75] Inventors: Wilfried Eichhorn, Königstein; Peter Seibel, Kelkheim, both of Fed. Rep. of Germany

[73] Assignee: Hoechst Aktiengesellschaft, Frankfurt, Fed. Rep. of Germany

[21] Appl. No.: 956,333

[22] Filed: Oct. 31, 1978

[30] Foreign Application Priority Data

Nov. 2, 1977 [DE] Fed. Rep. of Germany ....... 2748901

[51] Int. Cl.$^3$ .................. C08F 263/04; C08F 6/10
[52] U.S. Cl. .................................... 525/253; 525/244; 525/261; 525/264; 525/265; 525/267; 525/273; 528/495; 528/496
[58] Field of Search ............... 260/874; 528/495, 496; 525/301, 253, 267

[56] References Cited

U.S. PATENT DOCUMENTS 3,987,235 10/1976 Fujimoto ............................. 528/481
4,147,859 4/1979 Davis et al. .......................... 528/496

OTHER PUBLICATIONS

Chem. Abs. 77p: 6024x; 77p: 35538y; 80p: 19385c; 82p: 31898w; 82p: 112442v; 84p: 44950y; 84p: 79594n; 85p: 99032b.

Primary Examiner—Wilbert J. Briggs, Sr.
Attorney, Agent, or Firm—Curtis, Morris & Safford

[57] ABSTRACT

Copolymers of vinyl esters and crotonic acid are commonly prepared by polymerizing the monomers in bulk or in solution by means of a radical-forming initiator in the presence of a regulator. The polymers should be free from residual monomers and impurities as far as possible. This may be realized in that upon completion of the polymerization the unreacted monomers and other volatile impurities are removed from the reaction mixture by distillation. For this purpose, the use of an entrainer is advantageous. The copolymers are suitable as starting materials for adhesives and hair lacquers, hair setting lotions as well as hair sprays.

6 Claims, No Drawings

PROCESS FOR THE MANUFACTURE OF A VINYL ESTER COPOLYMER

The present invention relates to a process for the manufacture of a vinyl ester copolymer.

The manufacture of copolymers of vinyl esters and crotonic acid is effected by polymerizing the monomers in bulk or in solution in the presence of a radical-forming initiator and usually in the presence of a regulator which is to adjust the molecular weight and the polymerization rate. The known copolymers are suitable in the form of alcoholic solutions as film-forming agents or binders in hair sprays and hair setting lotions.

The known copolymers very frequently show the drawback that they still contain a remainder of unreacted monomers and impurities; this leads to an unpleasant smell and may cause skin irritation when using these substances. It is therefore the object of the invention to manufacture vinyl ester/crotonic acid copolymers with little smell, which do not exhibit the drawbacks of the known copolymers.

The invention provides a process for the manufacture of a vinyl ester copolymer by polymerizing at least one vinyl ester and crotonic acid, optionally in the presence of a polyalkylene glycol, in the presence of a radical-forming initiator and a regulating substance, which comprises copolymerizing at least 70% by weight of the total amount of the vinyl ester with the total amount of the crotonic acid and optionally the total amount of the polyalkylene glycol, completing the polymerization, optionally after the addition of the residual amount of the vinyl ester and removing subsequently unreacted monomers and possible volatile impurities from the reaction mixture by distillation.

Within the framework of the invention there are used as vinyl esters above all vinyl esters of lower aliphatic monocarboxylic acids, especially compounds of the formula

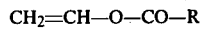

$$CH_2=CH-O-CO-R$$

in which R is an alkyl radical of from 1, 2 or 3 carbon atoms, for example vinyl acetate, vinyl propionate and vinyl butyrate. Preference is given in particular to vinyl acetate. Instead of a single vinyl ester there may also be used a mixture of several different vinyl esters.

As radical-forming initiators there are used peroxy compounds and aliphatic azo compounds, for example diacetyl peroxide, dibenzoyl peroxide, dilauroyl peroxide, diisopropyl percarbonate, tertiary butyl peroctoate, di-tertiary butyl peroxide and cumene hydroperoxide as well as azodiisobutyric acid nitrile and azo dicarbonamide. The amount of the initiator is in the range of from 0.01 to 5, preferably from 0.1 to 2% by weight, calculated on the total amount of the compounds to be polymerized.

The polymerization is commonly carried out in a temperature range of from 25° C. below the boiling temperature of the reaction mixture to the boiling temperature of the same. The temperature range of from 50° to 120° C., preferably from 70° to 100° C., is recommended. It is advantageous to carry out the polymerization under an inert gas atmosphere. As inert gases there may be used above all nitrogen and noble gases, such as argon.

As regulators there may be mentioned aliphatic mercaptans, lower aliphatic aldehydes and lower alkanols, especially aliphatic mercaptans having from 4 to 16 carbon atoms, for example n-butyl mercaptan, t-butyl mercaptan and n-dodecyl mercaptan, furthermore, aliphatic aldehydes of from 2 to 4 carbon atoms, for example acetaldehyde, propionaldehyde and butyraldehyde, as well as alkanols of from 1 to 4 carbon atoms, for example methanol, ethanol, isopropanol and t-butanol.

A preferred embodiment of the process of the invention is the execution of the polymerization in two stages, according to which the main amount of the vinyl ester is at first polymerized with the total amount of the crotonic acid and optionally the total amount of the polyalkylene glycol, and thereafter the polymerization is completed after adding the remainder of vinyl ester. The weight ratio of the monomers vinyl ester/crotonic acid that are used altogether is in the range of from 100:1 to 100:20, preferably from 100:5 to 100:15. In the first polymerization stage, from 70 to 98% by weight of the total amount of the vinyl ester are normally used, preferably from 80 to 95% by weight; in this process the crotonic acid employed is polymerized almost completely. The polymerization of the remaining 2 to 30, preferably from 5 to 20% by weight the total amount of the vinyl ester is then effected in the second stage, optionally while adding an additional amount of initiator.

An essential feature of the process of the invention is to be seen in the measure that upon completion of the polymerization the remaining unreacted monomers and possible volatile impurities, which have been introduced with the monomers into the reaction mixture or have been formed in the course of the reaction, are removed from the reaction mixture by way of distillation, so that the vinyl ester copolymer extracted is obtained in a largely pure form and with little smell. For this purpose it is advantageous to use an entrainer in which the copolymer is at least partially soluble or swellable. As entrainers there are suitable in particular lower alkanols of from 1 to 3 carbon atoms, for example methanol, ethanol and isopropanol; the entrainer may contain up to 20% by weight of water. Said entrainer is employed in an amount of from 5 to 50, preferably 10 to 30% by weight, calculated on the copolymer. It is advantageous to mix the entrainer with the copolymer which upon completion of the polymerization is present in a melted form, however, it may also be added to the reaction mixture before or during the polymerization, if it does not disturb the reaction. The entrainer which is removed by distillation may be used several times without working-up.

If a vinyl ester and crotonic acid are used as the only polymerizable compounds, the process of the invention leads to copolymers with a statistical distribution of the monomer units. However, if a polyalkylene glycol is additionally employed, graft copolymers are obtained.

As polyalkylene glycols there are suitable above all polyalkylene glycols with an average molecular weight (numerical average) of from 106 to 25,000, preferably from 1,000 to 15,000, i.e. oligomer compounds and higher molecular weight polymers of aliphatic diols or corresponding cyclic ethers. As oligomers there may be mentioned diethylene glycol, triethylene glycol, tetraethylene glycol as well as dipropylene glycol and tripropylene glycol; as polymers there are mentioned especially polyethylene glycol and polypropylene glycol. Copolymers of different cyclic ethers, especially of ethylene oxide and 1,2-propylene oxide, may also be used.

The polymers obtained according to the invention are suitable as starting materials for adhesives and especially for hair lacquers, hair setting lotions and hair sprays. In the field of cosmetics they are commonly used in the form of diluted solutions in mixtures of water and lower alcohols, especially ethanol or isopropanol. The polymer content of solutions of this kind is generally in the range of from 2 to 5% by weight.

The following Examples illustrate the invention and show the advantages over the state of the art, which may be seen from the comparison examples. All percentages relate to the weight; "ppm" means "parts per million". The monomer content of the polymer solution is determined in each case by way of gas chromatography.

EXAMPLE 1

15 Percent of a mixture of 56 kg of vinyl acetate, 6.3 kg of crotonic acid, 1.3 kg of dibenzoyl peroxide and 0.25 kg of acetaldehyde are placed into a stirring vessel having a capacity of 100 liters and being flushed with nitrogen, the vessel being provided with a reflux condenser, a jacket heating and cooling, and said mixture is heated to reflux temperature (about 70° C.). In the course of 7 hours the remaining 85% of the above mixture are uniformly added, in which process the polymerization heat is carried off by the jacket cooling in a manner that a slight reflux is maintained and the internal temperature rises slowly to 90° to 95° C. Subsequently 7 kg of vinyl acetate are added in doses in the course of 1 hour.

After having been heated for 2 hours at 95° C., the reaction mixture is distilled under reduced pressure (about 70 mbars) for 5 hours. The remaining polymer melt is let off into a trough and is allowed to cool therein the room temperature and solidifies. From the polymer thus obtained, a 60% solution in ethanol is prepared; it contains 65 ppm of crotonic acid and 1,210 ppm of vinyl acetate. This solution is concentrated to a solids content of 70% by removing ethanol by distillation, thereafter it is diluted again with ethanol to a content of 60%; it now contains 60 ppm of crotonic acid and 340 ppm of vinyl acetate and is almost odorless.

EXAMPLE 2

The process is carried out as has been described in Example 1, however, the starting mixture is composed of 49 kg of vinyl acetate, 6.3 kg of crotonic acid, 1.1 kg of dibenzoyl peroxide and 0.25 kg of acetaldehyde, and the introduction of the 85% portion takes 6 hours; in the second stage, 14 kg of vinyl acetate, in which 0.24 kg of dibenzoyl peroxide is dissolved, are added in doses in the course of 2 hours.

The 60% solution in ethanol prepared from the polymer obtained is concentrated to a solids content of 80% by distilling off ethanol, and thereafter said mixture is again diluted with ethanol to a content of 60%. The solution then contains 27 ppm of crotonic acid and 65 ppm of vinyl acetate and is odorless.

EXAMPLE 3

The process is carried out as has been described in Example 1, however, the starting mixture consists of 42 kg of vinyl acetate, 6.3 kg of crotonic acid, 1 kg of dibenzoyl peroxide and 0.25 kg of acetaldehyde, and the introduction of the 85% portion takes 5 hours; in the second stage, 21 kg of vinyl acetate, in which 0.34 kg of dibenzoyl peroxide is dissolved, are added in doses within 3 hours.

The 60% solution in ethanol prepared from the polymer obtained contains 11 ppm of crotonic acid and 1.215 ppm of vinyl acetate. It is concentrated to a solids content of 90% by distilling off ethanol, and subsequently it is diluted again to a content of 60% with ethanol. This solution contains now less than 10 ppm of crotonic acid and less than 20 ppm of vinyl acetate and is odorless.

Comparison Example 1

15 Percent of a mixture of 63 kg of vinyl acetate, 6.3 kg of crotonic acid, 1.3 kg of dibenzoyl peroxide and 0.25 kg of acetaldehyde are placed into the vessel described in Example 1 and the mixture is heated to reflux temperature (about 70° C.). In the course of 8 hours the remaining 85% of the above-mentioned mixture are uniformly added, the rise in temperature being regulated according to Example 1.

After having been heated for another 2 hours at 95° C., the reaction mixture is distilled under reduced pressure (about 70 mbars) for 5 hours. The remaining polymer melt is let off into a trough, where it is allowed to cool to room temperature and solidifies. From the polymer obtained, a 60% solution in ethanol is prepared; the solution having a strong smell contains 186 ppm of crotonic acid and 1.260 ppm of vinyl acetate.

EXAMPLE 4

6 Kilograms of polyethylene glycol having an average molecular weight of 4,000 and 15% of a mixture of 48 kg of vinyl acetate, 4.8 kg of crotonic acid, 1.2 kg of dibenzoyl peroxide and 0.25 kg of acetaldehyde are placed into the vessel described in Example 1, and the mixture is heated to reflux temperature (about 70° C.). In the course of 6 hours the remaining 85% of the above-mentioned mixture are uniformly added, the rise in temperature being regulated according to Example 1. Subsequently 12 kg of vinyl acetate, in which 0.3 kg of dibenzoyl peroxide is dissolved, are added in doses in the second stage within 2 hours.

After having been heated for another 2 hours at 95° C., the reaction mixture is distilled for 5 hours under reduced pressure (about 70 mbars). The remaining polymer melt is let off into a trough and is allowed to cool therein to room temperature and solidifies. From the polymer obtained a 60% solution is prepared in an isopropanol/water mixture (87/13), which contains 35 ppm of crotonic acid and 1,350 ppm of vinyl acetate. This solution is concentrated to a solids content of 80% by distilling off the solvent and is then diluted again to a content of 60% with the same solvent; it then contains 33 ppm of crotonic acid and 60 ppm of vinyl acetate and is almost free from any smell.

EXAMPLE 5

The process is carried out as has been described in Example 4, however, while introducing 6 kg of polypropylene glycol having an average molecular weight of 2,000 and 4 kg of isopropanol, and the starting mixture consists of 48 kg of vinyl acetate, 4,8 kg of crotonic acid and 1.2 kg of tertiary butyl peroctoate; the introduction of the 85% portion takes 6 hours. In the second stage, 12 kg of vinyl acetate, in which 0.3 kg of tertiary butyl peroctoate has been dissolved, are added in doses in the course of 2 hours.

The 60% solution in isopropanol/water (87/13) perpared from a sample of the polymer obtained contains 32 ppm of crotonic acid and 970 ppm of vinyl acetate. Thereafter 600 g of the solid polymer are melted together with 600 g of isopropanol. Subsequently 252 g of isopropanol are distilled off, and 52 ml of water are added, while stirring. The 60% solution thus obtained contains 30 ppm of crotonic acid and 55 ppm of vinyl acetate.

Comparison Example 2

6 Kilograms of polyethylene glycol having an average molecular weight of 4,000 and 15% of a mixture of 60 kg of vinyl acetate, 4.8 kg of crotonic acid, 1.5 kg of dibenzoyl peroxide and 0.25 kg of acetaldehyde are placed into the vessel described in Example 1, and the mixture is heated to reflux temperature (about 70° C.). In the course of 8 hours, the remaining 85% of the above-mentioned mixture are uniformly added, the rise in temperature being regulated in accordance with Example 1.

After having been heated for another 2 hours at 95° C., the reaction mixture is distilled for 5 hours under reduced pressure (about 70 mbars). The remaining polymer melt is let off into a trough, where it is allowed to cool to room temperature and solidifies. From the polymer thus obtained, a 60% solution in an isopropanol/water mixture (87/13) is prepared, which solution contains 197 ppm of crotonic acid and 1,320 ppm of vinyl acetate.

Comparison Example 3

The process is carried out as has been described in Comparison Example 2, however, while using instead of polyethylene glycol polypropylene glycol having an average molecular weight of 2,000, and as starting mixture there is used a mixture of 60 kg of vinyl acetate, 4.8 kg of crotonic acid and 1.5 kg of tertiary butyl peroctoate.

The 60% solution in isopropanol/water (87/13) prepared from the polymer obtained contains 210 ppm of crotonic acid and 1,130 ppm of vinyl acetate.

What is claimed is:

1. A process for the manufacture of a copolymer of at least one vinyl ester and crotonic acid which comprises copolymerizing 70% to 98% by weight of the total amount of vinyl ester with the total amount of crotonic acid in the presence of a radical-forming initiator and a polymerization regulator, adding the remainder of the vinyl ester to the polymerization reaction mixture and completing the polymerization, mixing the polymer with an entrainer which is an alkanol of 1 to 4 carbon atoms that may contain up to 20% by weight of water and heating the resulting mixture to vaporize at least a part of said alkanol and thereby distill from said copolymer residual monomer and other volatile impurities.

2. The process of claim 1 which comprises using as vinyl ester vinyl acetate, vinyl propionate or vinyl butyrate along or in admixture.

3. A vinyl ester/crotonic acid copolymer obtained according to the process as claimed in claim 1.

4. A process for the manufacture of a copolymer of at least one vinyl ester and crotonic acid which comprises a copolymerizing the vinyl ester and crotonic acid in a two-stage polymerization using a vinyl ester/crotonic acid weight ratio of 100:1 to 100:20, in the first stage copolymerizing a portion comprising 70% to 98% by weight of the total amount of the vinyl ester with the total amount of crotonic acid in the presence of a radical-forming initiator and a polymerization regulator, in the second stage adding the remainder of the vinyl ester to the polymerization mixture and completing the polymerization, dissolving the polymer in an entrainer which is an alkanol of 1 to 4 carbon atoms that may contain up to 20% by weight of water and heating the resulting solution to vaporize at least a part of said alkanol and thereby distill from said copolymer solution residual monomer and other volatile impurities.

5. A process according to claims 1 or 4 wherein the copolymerization is carried out in the presence of a polyalkylene glycol to form a graft polymer.

6. The process of claim 5, which comprises using as polyalkylene glycol poly(ethylene glycol) or poly(propylene glycol) or both.

* * * * *